US009479716B2

United States Patent
Liao et al.

(10) Patent No.: US 9,479,716 B2
(45) Date of Patent: Oct. 25, 2016

(54) IMAGE PROCESSING METHOD, ELECTRONIC DEVICE, ELECTRONIC DEVICE READABLE STORAGE MEDIUM AND PROGRAM APPLIED IN ELECTRONIC DEVICE

(71) Applicant: ABILITY ENTERPRISE CO., LTD., New Taipei (TW)

(72) Inventors: Tzu-Wen Liao, New Taipei (TW); Yi-Jian Lee, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 117 days.

(21) Appl. No.: 14/517,210

(22) Filed: Oct. 17, 2014

(65) Prior Publication Data

US 2015/0117770 A1    Apr. 30, 2015

(30) Foreign Application Priority Data

Oct. 29, 2013   (TW) ............................. 102139130 A (51) Int. Cl.
| | | |
|---|---|---|
| G06K 9/00 | (2006.01) | |
| H04N 5/357 | (2011.01) | |
| G06T 5/00 | (2006.01) | |
| H04N 5/232 | (2006.01) | |

(52) U.S. Cl.
CPC ............ *H04N 5/3572* (2013.01); *G06T 5/008* (2013.01); *H04N 5/23293* (2013.01); *G06T 2207/10016* (2013.01); *G06T 2207/10024* (2013.01)

(58) Field of Classification Search
CPC ...................... G06K 9/00281; G06K 9/00295; G06K 9/00335; G06K 9/3216; G06K 9/6256; G06K 9/6292; G06K 9/6857; G06K 2209/3291; G06T 5/008; G06T 5/50; G06T 7/0012; G06T 7/2033; G06T 7/204; G06T 2207/10016; G06T 2207/10072; G06T 2207/20016; G06T 2207/20081; G06T 2207/20108; G06T 2207/20216; G06T 2207/30104; G06T 2207/30201; G06T 2207/30241; G01R 33/4835; G01R 33/5601; G01R 33/56366; G06F 3/04842; G06F 3/04845; G06F 3/0485; G06F 17/30274; H04N 1/4072; H04N 5/3572; H04N 5/23293
See application file for complete search history.

(56) References Cited

U.S. PATENT DOCUMENTS

| | | | | |
|---|---|---|---|---|
| 5,818,975 A * | 10/1998 | Goodwin | ............. | H04N 1/4072 345/589 |
| 7,676,113 B2 * | 3/2010 | Damera-Venkata | ...... | G06T 5/50 345/204 |
| 8,285,360 B2 * | 10/2012 | Kabasawa | ............ | A61B 5/0263 382/128 |
| 8,369,574 B2 * | 2/2013 | Hu | ..................... | G06K 9/00335 382/103 |
| 8,963,962 B2 * | 2/2015 | Ubillos | ................... | H04L 51/24 345/661 |

* cited by examiner

*Primary Examiner* — Jose Couso
(74) *Attorney, Agent, or Firm* — Rabin & Berdo, P.C.

(57) ABSTRACT

An image processing method comprises: receiving a first image; setting at least one first region on the first image, where the first image comprises at least one line; calculating a first average value of the first region; performing computation on the first image with a first parameter set to generate a second image; setting a second region of the second image according to the first region, and calculating a second average value of the second region; calculating a difference between the first average value and the second average value; and determining whether to replace the first image with the second image according to the difference.

20 Claims, 5 Drawing Sheets

| -1 | -2 | -1 |
|---|---|---|
| 0 | 0 | 0 |
| 1 | 2 | 1 |

FIG. 4A

| -1 | 0 | 1 |
|---|---|---|
| -2 | 0 | 2 |
| -1 | 0 | 1 |

FIG. 4B

IMAGE PROCESSING METHOD, ELECTRONIC DEVICE, ELECTRONIC DEVICE READABLE STORAGE MEDIUM AND PROGRAM APPLIED IN ELECTRONIC DEVICE

ELECTRONIC DEVICE

This application claims the benefit of Taiwan application Ser. No. 102139130, filed Oct. 29, 2013, the disclosure of which is incorporated by reference herein in its entirety.

TECHNICAL FIELD

The present invention relates to an image processing method, an electronic device, an electronic-device-readable storage medium and a program applied in an electronic device, and more particularly to an image processing method, an electronic device, an electronic-device-readable storage medium and a program applied in an electronic device for performing post-processing on images.

BACKGROUND

Optical lens are commonly used in cameras, camcorders, telescopes, microscopes and etc., which utilizes the refraction of light to focus an object on a focusing plane. However, there is a dispersion problem for lens refraction. That is, light with different colors have different frequencies and refraction ratios, which causes the profile of an object in an image to be purplish or bluish.

The main reason is that during video recording, under the premise that the contrast between multiple objects being photographed is larger, the junction between the high-light portions and the low-light portions occurs chromatism phenomenon such as color stain. Generally, edge lines with the abnormal colors occur in the chromatism phenomenon are usually purplish or bluish.

Therefore, there a need for providing an image processing method, an electronic device, an electronic device-readable storage medium and a program applied in an electronic device for solving such known deficiency.

SUMMARY

In order to solve the abovementioned problems, the present invention provides an image processing method, an electronic device, an electronic-device-readable storage medium and a program applied in an electronic device.

An image processing method of the present invention comprises: receiving a first image; setting at least one first region on the first image, where the first image comprises at least one line; calculating a first average value of the first region; performing computation on the first image with a first parameter set to generate a second image; setting a second region of the second image according to the first region, and calculating a second average value of the second region; calculating a difference between the first average value and the second average value; and determining whether to replace the first image with the second image according to the difference.

An electronic device of the present invention comprises a storage module and a computation module. The storage module stores a first image. The computation module sets a first region according to a line of the first image, and after the computation module calculates a first average value for the first image, the computation module forms a second image by a first parameter set and the first image, and calculates a second average value for a second region of the second image, and determines maintaining the first image or the second image according to a difference between the first average value and the second average value.

A program applied in an electronic device of the present invention is provided. After the electronic device loads the program and is started, the electronic device performs an image processing method. The image processing method comprises: receiving a first image; setting at least one first region on the first image, where the first image comprises at least one line; calculating a first average value of the first region; performing computation on the first image with a first parameter set to generate a second image; setting a second region of the second image according to the first region, and calculating a second average value of the second region; calculating a difference between the first average value and the second average value; and determining whether to replace the first image with the second image according to the difference.

An electronic-device-readable storage medium of the present invention is provided. The storage medium stores a program. After an electronic device loads the program and is started, the electronic device may perform an image processing method. The image processing method comprises: receiving a first image; setting at least one first region on the first image, where the first image comprises at least one line; calculating a first average value of the first region; performing computation on the first image with a first parameter set to generate a second image; setting a second region of the second image according to the first region, and calculating a second average value of the second region; calculating a difference between the first average value and the second average value; and determining whether to replace the first image with the second image according to the difference.

DETAILED DESCRIPTION

Figure 1A:
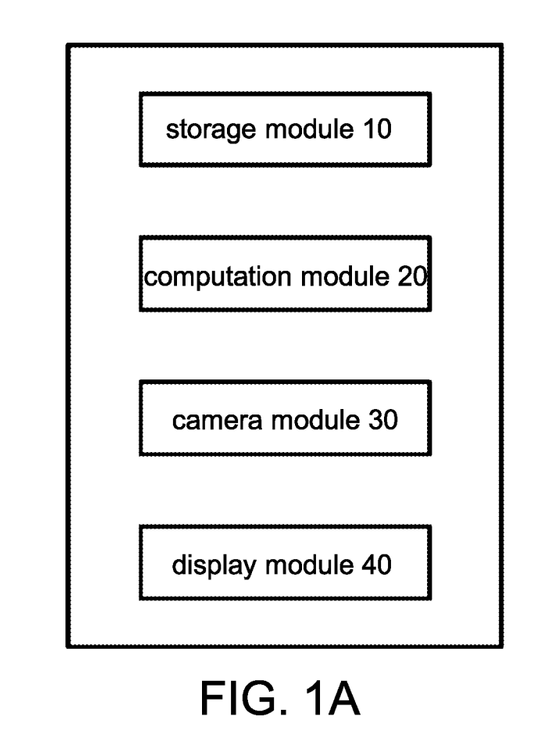
FIG. 1A is a system configuration diagram according to an embodiment of the present invention.

Referring to FIG. 1A, a system configuration diagram according to an embodiment of the present invention is shown. As shown in FIG. 1A, in an embodiment of the present, an electronic device mainly comprises a storage module 10 and a computation module 20. In the embodiment, the electronic device may further comprise a camera module 30 and a display module 40. The storage module 10 can be a storage medium such as a memory, a hard disk and etc. The computation module 20 may be a computation center or a signal processor, or may be realized by any type of general or specific integrated circuit, such as a micro processor, a micro controller, a digital signal processor, a programming array and/or the like, or may be realized by system on chip (SoC), which is capable of utilizing any suitable processing circuit under the control of any suitable control logic. The camera module 30 at least comprises a camera lens and an image sensing unit. The display module 40 may be, for example, a liquid crystal display, a touch panel or a flexible display, but the present invention is not limited thereto.

In an embodiment of the present invention, the electronic device may be a digital camera, a camcorder, a cell phone, a driving recorder, a tablet computer and etc. However, the present invention is not limited thereto. The electronic device also may be a common desktop computer, a laptop, or a device capable of receiving and processing images inputted from external.

Figure 1B:
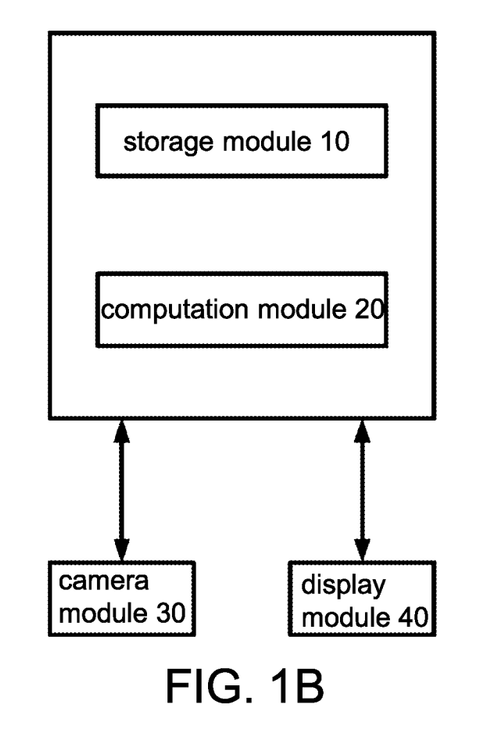
FIG. 1B is a system configuration diagram according to another embodiment of the present invention.

Referring to FIG. 1B, a system configuration diagram according to another embodiment of the present invention is shown. FIG. 1B is roughly the same as the FIG. 1A, and the identical elements of FIG. 1B are designated with the same reference numerals as that of FIG. 1A. However, as shown in FIG. 1B, the camera module 30 and/or the display module 40 may be additional to the electrical device and not for limiting the present invention.

According to another embodiment of the present invention, each of the abovementioned modules may be configured as a hardware device, a software program, a firmware or the combination thereof, and also may be configured as a circuitry or other types of configurations. In addition, without describing every possible variations and combinations, only preferred embodiments are described herein to avoid redundancy. However, one of ordinary skill in the art should understand that the abovementioned modules are not all necessary. Furthermore, in order to implement the present invention, other detailed conventional modules or elements may be comprised as well. Each module or element may be omitted or modified according to needs, and it is not necessary to dispose other modules or elements between any two modules.

Figure 2A:
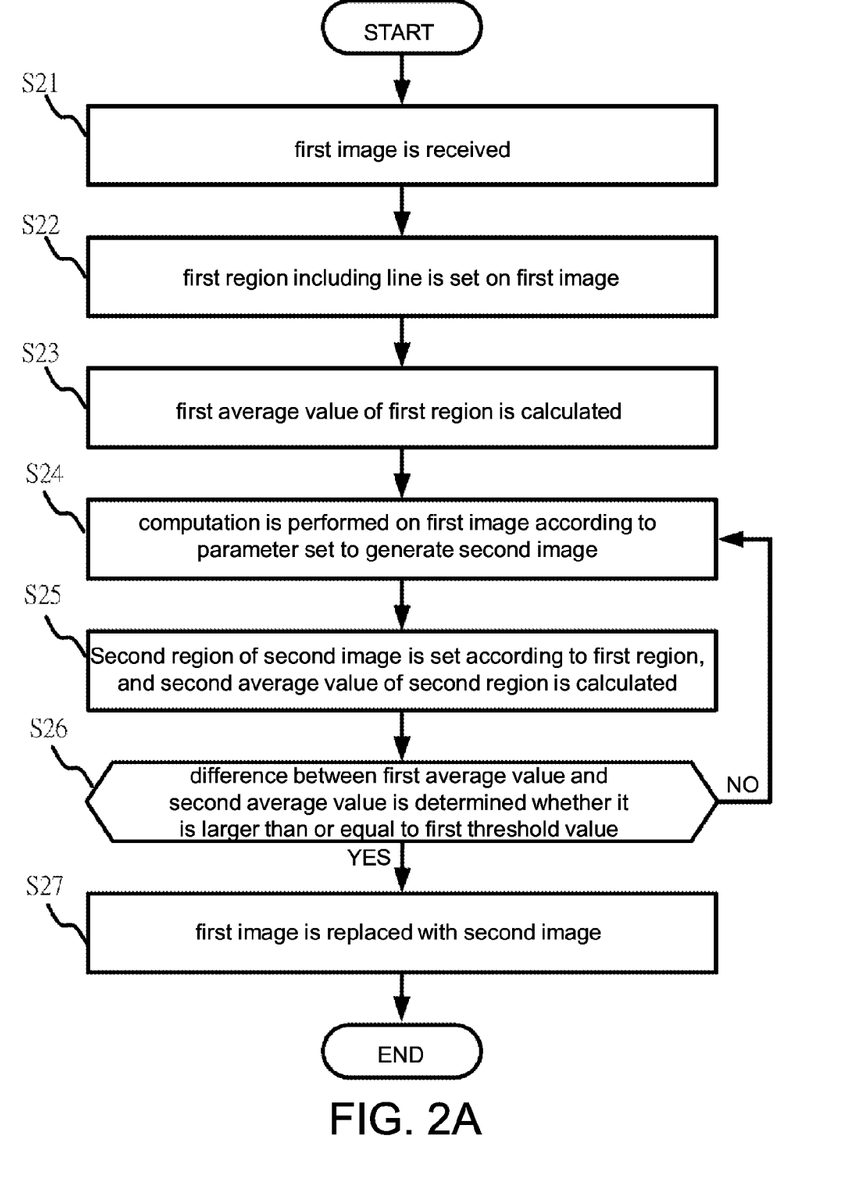
FIG. 2A is a flow chart of an image processing method according to an embodiment of the present invention.
Figure 2B:
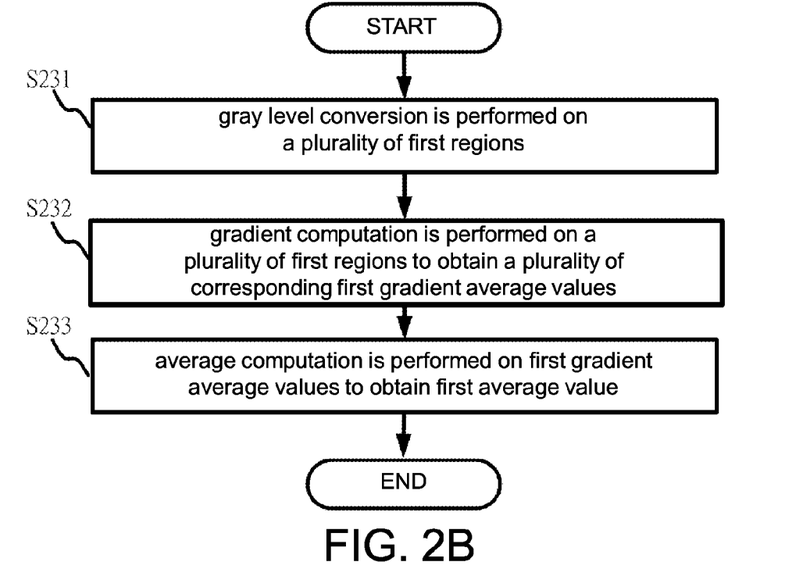
FIG. 2B is a flow chart of an image processing method calculating a first average value of a first region according to an embodiment of the present invention.
Figure 2C:
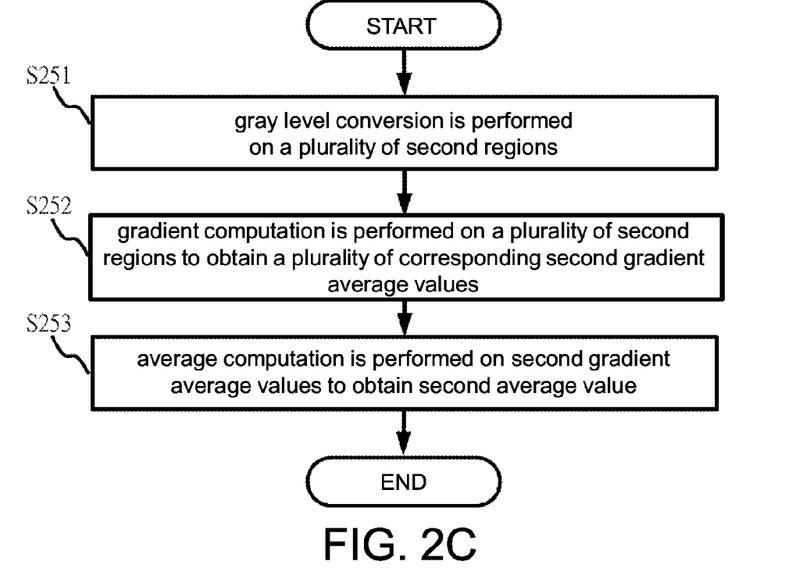
FIG. 2C is a flow chart of an image processing method calculating a second average value of a second region according to an embodiment of the present invention.
Figure 3A:
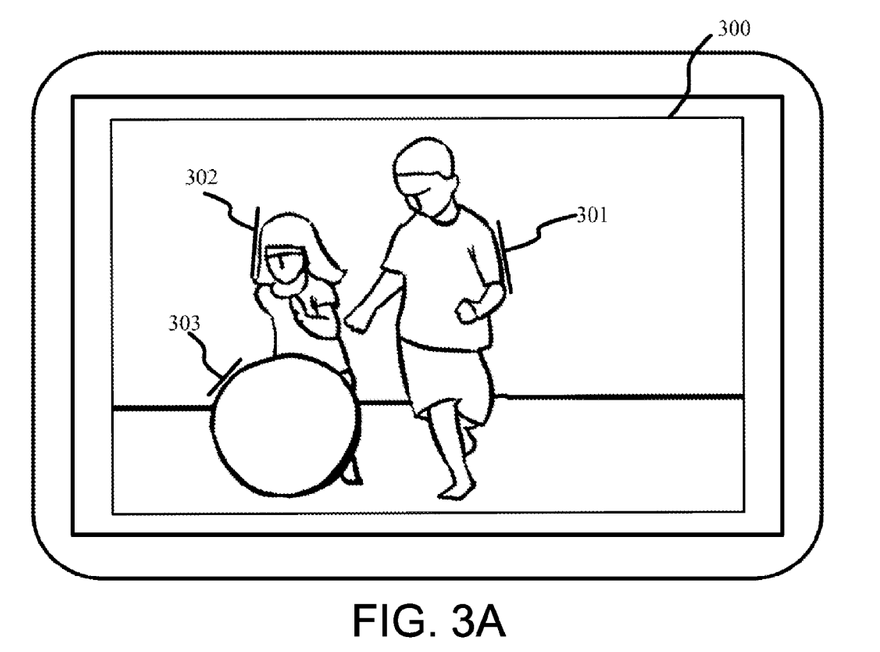
FIG. 3A is a schematic diagram of a first image of an embodiment of the present invention.
Figure 3B:
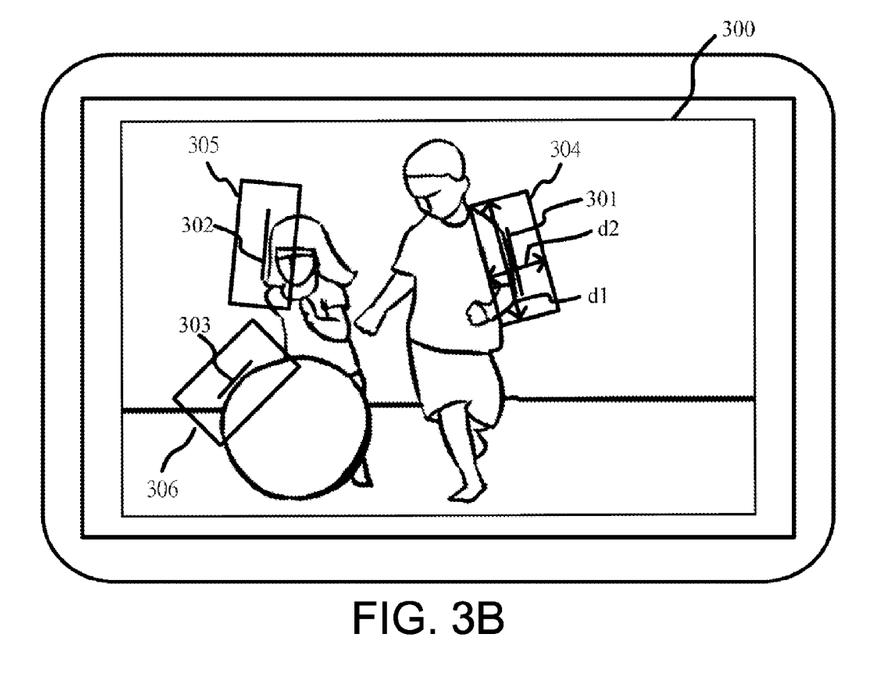
FIG. 3B is a schematic diagram of first regions of a first image of an embodiment of the present invention.
Figure 3C:
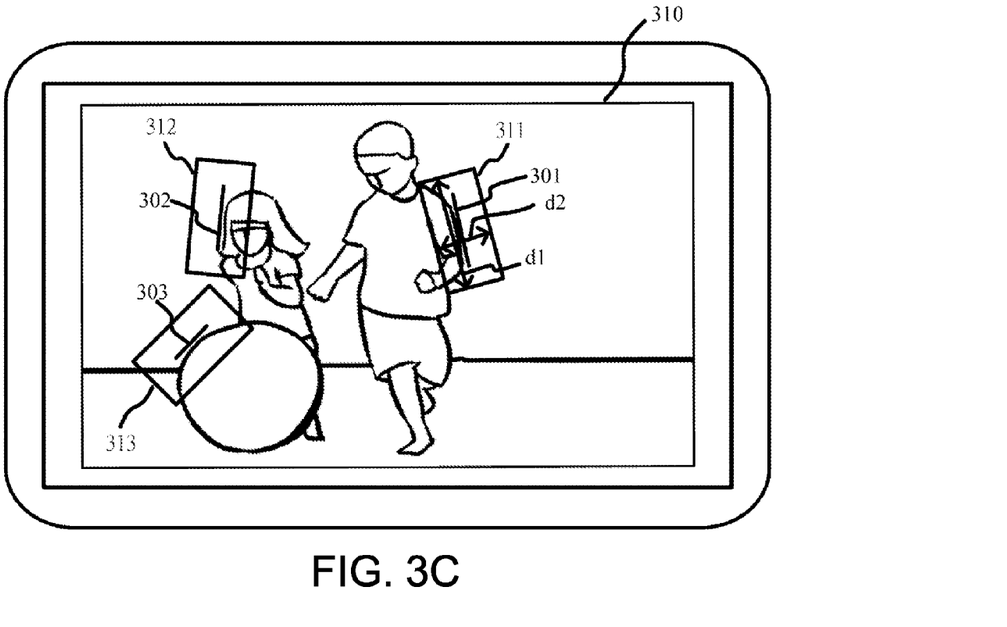
FIG. 3C is a schematic diagram of second regions of a second image of an embodiment of the present invention.

Next, please refer to FIGS. 2A, 2B, 2C, 3A, 3B and 3C. FIG. 2A shows a flow chart of an image processing method according to an embodiment of the present invention. FIG. 2B shows a flow chart of an image processing method calculating a first average value of a first region according to an embodiment of the present invention. FIG. 2C shows a flow chart of an image processing method calculating a second average value of a second region according to an embodiment of the present invention. FIG. 3A shows a schematic diagram of a first image of an embodiment of the present invention. FIG. 3B shows a schematic diagram of first regions of a first image of an embodiment of the present invention. FIG. 3C shows a schematic diagram of second regions of a second image of an embodiment of the present invention.

Below, the storage module 10, the computation module 20 and/or the camera module 30 and/or the display module 40 shown in FIGS. 1A and 1B are for illustrating the image processing method of the present invention.

First, step S21 is performed: a first image is received.

As shown in FIG. 3A, after obtaining a first image 300, the electronic device stores the first image 300 into the storage module 10 and shows the first image 300 on the display module 40. A user determines whether chromatism occurs on the first image 300 and plots lines 301, 302, 303. Alternatively, the electronic device plots the lines 301, 302, 303 by automatically identifying the locations where the chromatism occurs on the image 300, and the lines 301, 302, 303 are received by the computation module 20.

Then, step S22 is performed: a first region comprising a line is set on the first image.

According to an embodiment of the present invention, as shown in FIG. 3B, after receiving the lines 301, 302, 303, the computation module 20 sets the first regions 304, 305, 306 according to the lines 301, 302, 303 of the first image 300, respectively. For example, the first regions 304, 305, 306 comprise the lines 301, 302, 303, respectively.

Specifically, taking the line 301 as an example, the computation module 20 extends a first distance d1 along a first direction (e.g., the direction that the line 301 points to) from the line 301 that is regarded as a center, and extends a second distance d2 along a second direction (e.g., the normal direction of the tangent of the line 301) from the line 301 that is regarded as the center, and then sets the region that the two directions extend to as the first region 304. The first direction d1 may be a distance of 3 to 10 pixels and the second distance d2 may be a distance of 3 to 10 pixels, but the present invention is not limited thereto.

Besides, in another embodiment, when the plurality of lines 301, 302, 303 are very close to or intersected with each other, the first regions 304, 305, 306 also may be set from the first image 300 according to the close/intersected lines 301, 302, 303. That is, practically, the number of the first regions 304, 305, 306 may be less than or equal to the number of the lines 301, 302, 303. Each of the first regions 304, 305, 306 is not limited to having only one line 301, 302, 303 but also having more than one line 301, 302, 303 in the ranges of the first regions 304, 305, 306.

Next, step S23 is performed: a first average value of the first region is calculated.

After setting the first regions 304, 305, 306, the computation module 20 then calculates a first average value for the first regions 304, 305, 306. According to an embodiment of the present invention, step S23 can be divided into steps S231, S232 and S233.

Step S231: a gray level conversion is performed on a plurality of first regions.

First, the computation module 20 performs a gray level conversion on the first regions 304, 305, 306 to obtain a gray level image.

Step S232: a gradient calculation is performed on the plurality of the first regions to obtain a plurality of corresponding first gradient average values.

Then, the computation module 20 respectively performs the gradient computation on the first regions 304, 305, 306 to obtain first gradient average values of the first regions 304, 305 and 306, respectively. According to an embodiment of the present invention, the computation module 20 performs the gradient calculation by executing Sobel algorism, but the present invention is not limited thereto.

Figure 4A:
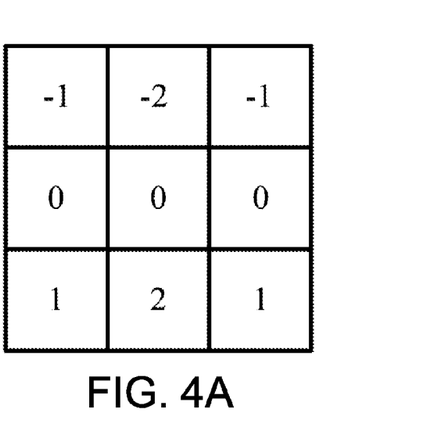
FIG. 4A represents a schematic diagram of a Sobel mask for x direction.
Figure 4B:
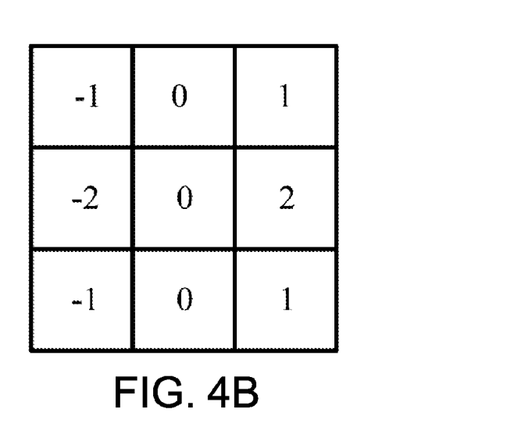
FIG. 4B represents a schematic diagram of a Sobel mask for y direction.

The present invention uses Sobel edge-detection mask to calculate the gradient magnitudes of the pixels in an image. The operation mechanism thereof is described as follows. Two 3×3 masks shown in FIGS. 4A and 4B respectively represent the x direction mask and the y direction mask. These two 3×3 masks are respectively convoluted with the first regions 304, 305, 306 to obtain the vertical gradient magnitude and horizontal gradient magnitude of the pixel location in the first regions 304, 305, 306, where ∇x G(x,y) represents the vertical gradient magnitude and ∇y G(x,y) represents the horizontal gradient magnitude. Detailed calculation process is as follows:

$$\nabla x G(2,2)=[G(1,3)-G(1,1)]+2\times[G(2,3)-G(2,1)]+[G(3,3)-G(3,1)]$$

$$\nabla y G(2,2)=[G(3,1)-G(1,1)]+2\times[G(3,2)-G(1,2)]+[G(3,3)-G(1,3)]$$

The square root of the sum of the squared vertical and horizontal gradient magnitudes is the gradient magnitude of the pixel location, say MG(x, y).

After Sobel algorism is respectively performed on the first regions 304, 305, 306, the gradient values of the plurality of pixels in the first regions 304, 305, 306 can be obtained. Then, the computation module 20 respectively performs average computation on the plurality of pixels in the first regions 304, 305, 306 so that the first gradient average values of the first regions 304, 305, 306 can be obtained, respectively. The average computation can be a conventional average value computation or an average value computation with weighting factors.

In an embodiment, the computation module 20 respectively determines whether the gradient values of the plurality of pixels in the first regions 304, 305, 306 are larger than or equal to a third threshold value, and then computes the first gradient average values of the first regions 304, 305, 306 according to the determined results. If so, average computation is performed on the gradient values of the pixels that are larger than or equal to the third threshold value to obtain the first gradient average values of the first regions 304, 305, 306. For the gradient values of the pixels that are smaller than the third threshold value, they are excluded from the computation. For example, if the gradient values of all of the pixels in the first regions 304 and 305 are larger than or equal to the third threshold value, the average computation is performed on all of the pixels in the regions when the first gradient average values of the first regions 304 and 305 are calculated. If the gradient values of part of the pixels in the first region 306 are smaller than the third threshold value, only the gradient values of the pixels in the first region 306 that are larger than or equal to the third threshold value are applied when the first gradient average values of the first regions 306 are calculated.

Step S233: the average computation is performed on the first gradient average values to obtain a first average value.

Finally, the computation module 20 performs average computation on the first gradient average values of the first regions 304, 305, 306 to obtain a first average value. However, it is to be noted that the way for computing the first average value is not limited thereto. For example, the computation module 20 may determine whether the first gradient average values of the first regions 304, 305, 306 are larger than or equal to a second threshold, and then computes the first average value according to the determined result. If so, the average computation is performed on the first gradient average values that are larger than or equal to the second threshold value to obtain the first average value. For the first gradient average values that are smaller than the second threshold value, they are excluded from the computation. For example, if the first gradient average values of the first regions 304 and 305 are larger than or equal to the second threshold value, and the first gradient average value of the first region 306 is smaller than the second threshold value, then only the first gradient average values of the first regions 304 and 305 are applied when the first average value is calculated.

According to an embodiment of the present invention, the computation module 20 may respectively determine a distance between the first regions 304, 305, 306 and a reference point of the first image 300, where the reference point may be a central point of the first image 300, a focusing position, or any point of the first image 300 chosen by a user. The computation module 20 may respectively perform weighted average computation on the first regions 304, 305, 306 according to the distance to obtain the first average value. For example, if the distances between the first regions 304, 305, 306 and the central point of the first image 300 or the focusing point of the first image 300 are 25, 50 and 100 pixels, respectively, which has a ratio of 1:2:4, when the first average value is calculated, the first gradient average values are substituted into the calculation of the first average value also with a ratio of 1:2:4.

Then, step S24 is performed: a computation is performed on the first image 300 according to a parameter base to generate a second image.

As shown in FIG. 3C, the computation module 20 then performs computation on the first image 300 with a first parameter set to generate a second image 310.

In an embodiment, the first parameter set may be inputted by a user or obtained from a parameter base. Specifically, the parameter base may be built in the electronic device. The parameter base may be a parameter assembly comprising at least one first parameter set and at least one second parameter set or an equation, and the at least one first parameter set and the at least one second parameter set comprise at least one parameter respectively.

Then, step S25 is performed: the second region of the second image is set according to the first region, and the second average value of the second region is calculated.

As shown in FIG. 3C, after obtaining the second image 310, the computation module 20 sets the second regions 311, 312, 313 of the second image 310 according to the locations and sizes of the first regions 304, 305, 306 in the first image 300, and calculates the second average values of the second regions 311, 312, 313. As shown in FIG. 2C, like step S23, step S25 also can be divided into steps S251, S252 and S253 at which after a gray level conversion is performed on the second regions 311, 312, 313, a gradient calculation is performed on the second regions 311, 312, 313 to obtain a plurality of corresponding second gradient average values, and then an average computation is performed on the plurality of second gradient average values to obtain the second average value. In another embodiment, the second average value may be obtained by performing weighted average computation with a distance between the second regions 311, 312, 313 and a reference point of the second image 310, where the reference point may be the central point of the second image 310 or a focusing position. For example, if the distances between the second regions 311, 312, 313 and the central point of the second image 310 or the focusing point of the first image 300 are 25, 50 and 100 pixels, respectively, which has a ratio of 1:2:4, when the second average value is calculated, the second gradient average values are substituted into the calculation of the second average value also with a ratio of 1:2:4.

Then, step S26 is performed: the difference between the first average value and the second average value is determined whether it is larger than or equal to a first threshold value.

After the computation module 20 obtains the first average value and the second average value, it calculates the difference between the first average value and the second average value, and determines whether the difference is larger than or equal to a first threshold value. If the difference is larger than or equal to the first threshold value, it means that the first parameter set applied at step S24 is proper, and then step S27 is performed. If the difference is smaller than the first threshold value, then steps S24 to S26 are repeated, at which a computation is performed on the first image 300 according to a second parameter set of the parameter base to generate another second image, and then the computation module 20 sets the second regions of the second image according to the first regions, and computes the second average value of the second region, and determines whether the difference between the first average value and the second average value is larger than or equal to the first threshold value again. It is to be noted that the second parameter set may be obtained from a user input, a parameter base but not limited to the order selection of the parameter base, or an equation. In an embodiment, if after several computations the computation module 20 still fails to obtain a second image that makes the difference be larger than the first threshold, a second image that makes the difference be closest to the first threshold would replace the first image.

In another embodiment, if the computation module 20 calculates a difference between the first average value and the second average value and the difference is smaller than the first threshold value, and the difference of that the second average value minus the first average value is a positive number, the first image is replaced with the second image, and the first average value is replaced with the second average value. Furthermore, steps S24 to S26 are repeated, and a computation is performed on the first image according to the first parameter set to generate another second image. Then, the computation module 20 sets the second regions of the second image according to the first regions, and calculates the second average value of the second regions, and determines whether the difference between the first average value and the second average value is larger than or equal to the first threshold value again.

Finally, step S27 is performed: the first image is replaced with the second image. In addition, the second image is stored by the storage module 10.

Here it is to be noted that the image processing method of the present invention is not limited to the abovementioned order of performing the steps, and the order of performing the steps can be modified as long as the goal of the present invention can be achieved.

Moreover, the image processing method of the present invention can be realized by a program and stored in an electronic device.

In an embodiment, when the electronic device loads the program and after the program is started, the electronic device receives a first image, and sets at least one first region on the first image, and calculates a first average value of the first region, and performs a computation on the first image according to a first parameter set to generate a second image. Furthermore, the electronic device sets a second region of a second image according to the first region, and calculates a second average value of the second region. In addition, the electronic device calculates the difference between the first average value and the second average value, and determines whether to replace the first image with the second image according to the difference.

Moreover, the image processing method of the present invention can be realized by a program and built in a readable storage medium.

In an embodiment, the readable storage medium is built in an electronic device and the program is loaded by the electronic device. After the program is started, the electronic device receives a first image, and sets at least one first region on the first image, and calculates a first average value of the first region, and performs a computation on the first image according to a first parameter set to generate a second image. Furthermore, the electronic device sets a second region of a second image according to the first region, and calculates a second average value of the second region. In addition, the electronic device calculates the difference between the first average value and the second average value, and determines whether to replace the first image with the second image according to the difference.

In short, the image processing method of the present invention can be realized by a program. The program can be stored in storage medium such as a hard disk, a floppy disk, CD-ROM and etc. The electronic device is capable of reading the storage medium.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An image processing method, comprising:
    using a storage circuit to access a first image;
    adopting a computation circuit to set a first region on the first image and to calculate a first average value of the first region, wherein the first region comprises a line, and using the computation circuit to perform a computation with a first parameter set on the first image to generate a second image;
    setting a second region of the second image in accordance with the first region, and calculating a second average value of the second region and a difference between the first average value and the second average value by the computation circuit; and
    according to the calculated difference, determining whether to replace the first image with the second image by the computation circuit.

2. The image processing method according to claim 1, further comprising:
    if the difference is smaller than a first threshold value, performing the computation on the first image with a second parameter set; and
    if the difference is larger than or equal to the first threshold value, replacing the first image with the second image.

3. The image processing method according to claim 1, wherein the first image comprises a plurality of the first regions and the second image comprises a plurality of the second regions, and the step of calculating the first average value and/or the second average value comprises:
    performing a gradient calculation on the first regions to obtaining a plurality of first gradient average values, or performing a gradient calculation on the second regions to obtaining a plurality of second gradient average values; and
    performing an average computation on the first gradient average values to obtain the first average value, and/or performing the average computation on the second gradient average values to obtain the second average value.

4. The image processing method according to claim 3, wherein the step of performing the average computation on the first gradient average values and/or the second gradient average values further comprises:
   determining whether each of the first gradient average values and/or the second gradient average values are larger than or equal to a second threshold value; and
   if so, performing the average computation on the first gradient average values and/or the second gradient average values that are larger than or equal to the second threshold value.

5. The image processing method according to claim 3, wherein a plurality of the first regions and a plurality of the second regions respectively comprise a plurality of gradient values of pixels, and the step of calculating the first gradient average values and/or the second gradient average values further comprises:
   respectively determining whether the gradient values of the pixels are larger than or equal to a third threshold value; and
   if so, performing the average computation on the gradient values of the pixels that are larger than or equal to the third threshold value.

6. The image processing method according to claim 1, further comprising:
   if the difference is smaller than a first threshold value and the difference is a positive number, replacing the first image with the second image.

7. The image processing method according to claim 3, wherein the step of performing the average computation on the first gradient average values and/or the second gradient average values further comprises:
   respectively determining a distance between each of the first and/or second regions and a reference point of the first and/or second image; and
   performing a weighted average computation on the corresponding first and/or second gradient average values according to each of the distances, respectively.

8. The image processing method according to claim 7, wherein the reference point is a central point or a focusing position of the first image and/or the second image.

9. A program applied in an electronic device including a non-volatile computer readable medium for carrying out the program, wherein after the electronic device loads the program and is started, the electronic device performs the image processing method according to claim 1.

10. A non-transitory electronic-device-readable storage medium, storing the program according to claim 9.

11. An electronic device, comprising:
   a storage circuit, storing a first image; and
   a computation circuit, setting a first region with a line of the first image and after calculating a first average value of the first image, forming a second image with a first parameter set and the first image, calculating a second average value of a second region of the second image, and maintaining one of the first image and the second image in accordance with a difference between the first average value and the second average value.

12. The electronic device according to claim 11, wherein when the computation circuit determines the difference is smaller than a first threshold value, performing a computation on the first image with a second parameter set; and when the computation circuit determines the difference is larger than or equal to the first threshold value, asking the storage circuit to store the second image.

13. The electronic device according to claim 11, wherein the first image comprises a plurality of the first regions and the second image comprises a plurality of the second regions, the computation circuit performs a gradient calculation on the first regions to obtain a plurality of corresponding first gradient average values and performs the gradient calculation on the second regions to obtain a plurality of corresponding second gradient average values.

14. The electronic device according to claim 13, wherein the computation circuit performs an average computation on the first gradient average values that are larger than or equal to a second threshold value to obtain the first average value, and/or performs the average computation on the second gradient average values that are larger than or equal to the second threshold value to obtain the second average value.

15. The electronic device according to claim 13, wherein a plurality of the first regions and a plurality of the second regions respectively comprise a plurality of gradient values of pixels, and the computation circuit performs the average computation on the gradient values of the pixels that are larger than or equal to a third threshold value to obtain the first gradient average values.

16. The electronic device according to claim 11, wherein when the computation circuit determines the difference is smaller than a first threshold value and the difference is a positive number, replacing the first image with the second image.

17. The electronic device according to claim 13, wherein the computation circuit performs a weighted average computation on the first gradient average values in accordance with a distance between each of the first regions and a reference point of the first image to obtain the first average value, and/or performs the weighted average computation on the second gradient average values in accordance with a distance between each of the second regions and a reference point of the second image to obtain the second average value.

18. The electronic device according to claim 16, wherein the reference point is a central point or a focusing position of the first image and/or the second image.

19. The electronic device according to claim 11, wherein the first region or the second region is formed by extending a first distance along a first direction from the line that is regarded as a center and extending a second distance along a second direction from the line that is regarded as the center.

20. An image processing method performed by a computation circuit, the method comprising:
   setting a first region on a first image, and calculating a first average value of the first region;
   performing a first parameter set with the first image and calculating a second image;
   setting a second region of the second image according to the first region, and calculating a second average value of the second region;
   calculating a difference between the first average value and the second average value; and
   determining whether to replace the first image with the second image in accordance with the difference.

* * * * *